United States Patent
Caronni et al.

(10) Patent No.: US 7,107,459 B2
(45) Date of Patent: Sep. 12, 2006

(54) SECURE CPU AND MEMORY MANAGEMENT UNIT WITH CRYPTOGRAPHIC EXTENSIONS

(75) Inventors: Germano Caronni, Palo Alto, CA (US); Glenn Scott, Mountain View, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 896 days.

(21) Appl. No.: 10/046,398

(22) Filed: Jan. 16, 2002

(65) Prior Publication Data

US 2003/0133574 A1 Jul. 17, 2003

(51) Int. Cl.
*G06F 12/14* (2006.01)
(52) U.S. Cl. ...................... 713/190; 380/277
(58) Field of Classification Search .............. 713/190; 380/277
See application file for complete search history.

(56) References Cited

U.S. PATENT DOCUMENTS 5,666,411 A * 9/1997 McCarty ................. 705/51
5,915,025 A * 6/1999 Taguchi et al. ............ 380/44
6,523,118 B1 * 2/2003 Buer ......................... 713/189
6,910,094 B1 * 6/2005 Eslinger et al. ............ 711/5

FOREIGN PATENT DOCUMENTS

EP 0 583 140 A1 2/1994
WO 02/25410 A2 3/2002

OTHER PUBLICATIONS

U.K. Search Report.

* cited by examiner

*Primary Examiner*—Matthew Smithers
(74) *Attorney, Agent, or Firm*—Finnegan, Henderson, Farabow, Garrett, & Dunner, L.L.P.

(57) ABSTRACT

Methods and systems for accessing information in and loading encrypted information to memory. A processor provides virtual address information to a memory management unit. In response, the memory management unit retrieves a key tag and physical address information corresponding to the virtual address information. The memory management unit then sends the key tag and physical address information to the processor. The processor then determines whether a memory location corresponding to the physical address information is encrypted based on the key tag, and retrieves a secret key using the key tag based on the determining. Thereafter, information read from the memory location is decrypted using the secret key.

51 Claims, 9 Drawing Sheets

SECURE CPU AND MEMORY MANAGEMENT UNIT WITH CRYPTOGRAPHIC EXTENSIONS

FIELD OF THE INVENTION

The present invention relates generally to data processing systems and, more particularly, to a secure CPU and memory management unit with cryptographic extensions.

BACKGROUND AND MATERIAL INFORMATION

Software piracy, the unauthorized copying of programs, has been an issue for software creators since the advent of the microprocessor. Software vendors have dealt with the piracy issue by various means. One method for protecting software involves copy protection.

Some examples of copy protection solutions use measures such as registration or serialization (serial number) of software, hard to copy computer readable media (e.g., copy protected floppy disk or CD-ROM), passive hardware tokens, active hardware tokens, smart cards, and on-board copy protection chips. These approaches, however, may be circumvented by accessing the address and data paths of a computer directly, and using information collected there to recreate the original unencrypted executable code.

Another approach to software protection involves a crypto microprocessor. A crypto microprocessor is a plug-in replacement device for the conventional microprocessor, but is capable of executing encrypted instructions. An encrypted program may execute only on a designated computer system incorporating a crypto microprocessor which decrypts the program according to a specific key or algorithm. Crypto microprocessors can be built at reasonable cost, since the translation circuitry is not unduly complex. In addition, the method does not interfere with computer user's customary practices. For example, the user is able to copy his software for backup purposes.

Despite all these innovations, the software piracy problem continues to plague the software industry.

SUMMARY OF THE INVENTION

Methods and systems consistent with the principles of the invention access information in a memory. A processor provides virtual address information to a memory management unit. In response, the memory management unit retrieves a key tag and physical address information corresponding to the virtual address information. The memory management unit then sends the key tag and physical address information to the processor. The processor retrieves a secret key using the key tag when it is determined that a memory location corresponding to the physical address information is protected. Thereafter, information read from the memory location may be decrypted using the secret key.

Other methods and systems consistent with the principles of the invention access information in a memory. A processor provides virtual address information to a memory management unit. In response, the memory management unit retrieves a key tag and physical address information corresponding to the virtual address information. The memory management unit then sends the key tag and physical address information to the processor. The processor looks up a secret key in a secret key table using the key tag. Thereafter, information read from a memory location corresponding to the physical address information is decrypted using the secret key.

Other methods and systems consistent with the principles of the invention load encrypted information into a memory. A processor is operable to determine whether a header associated with a program block includes an encrypted secret key. A secret key is decrypted based on a result of the determination. The decrypted secret key is stored in a secret key table and assigned a key tag for use in retrieving the decrypted secret key from the secret key table. The program block may then be loaded into the memory at a first memory location. Thereafter, the key tag is associated with virtual address information and physical address information corresponding to the memory location, wherein information read from the first memory location is decrypted using the decrypted secret key

BRIEF DESCRIPTION OF THE DRAWINGS

The accompanying drawings are incorporated in and constitute a part of this specification and, together with the description, explain the features and principles of the invention. In the drawings.

DETAILED DESCRIPTION

The following detailed description of the invention refers to the accompanying drawings. Although the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

Overview

Methods and systems consistent with the principles of the invention provide a facility to access information in a memory. A processor sends virtual address information to a memory management unit to retrieve a key tag and physical address information corresponding to the virtual address information. The memory management unit sends the key tag and physical address information to the processor to determine whether a memory location corresponding to the physical address information is protected based on the key tag and retrieve a secret key using the key tag based on the determining. Thereafter, information read from the first memory location is decrypted using the secret key, and information written to the first memory location is encrypted using the secret key.

The memory is loaded with a program by first determining whether a header associated with a program block includes an encrypted secret key. If an encrypted secret key is present, then it is decrypted. The secret key is then stored the in a secret key table and assigned a key tag for use in retrieving the secret key from the secret key table. Thereafter, the program block is loaded into the memory at a memory location; and the key tag is associated with virtual address information and physical address information corresponding to the memory location.

System Environment

Figure 1:
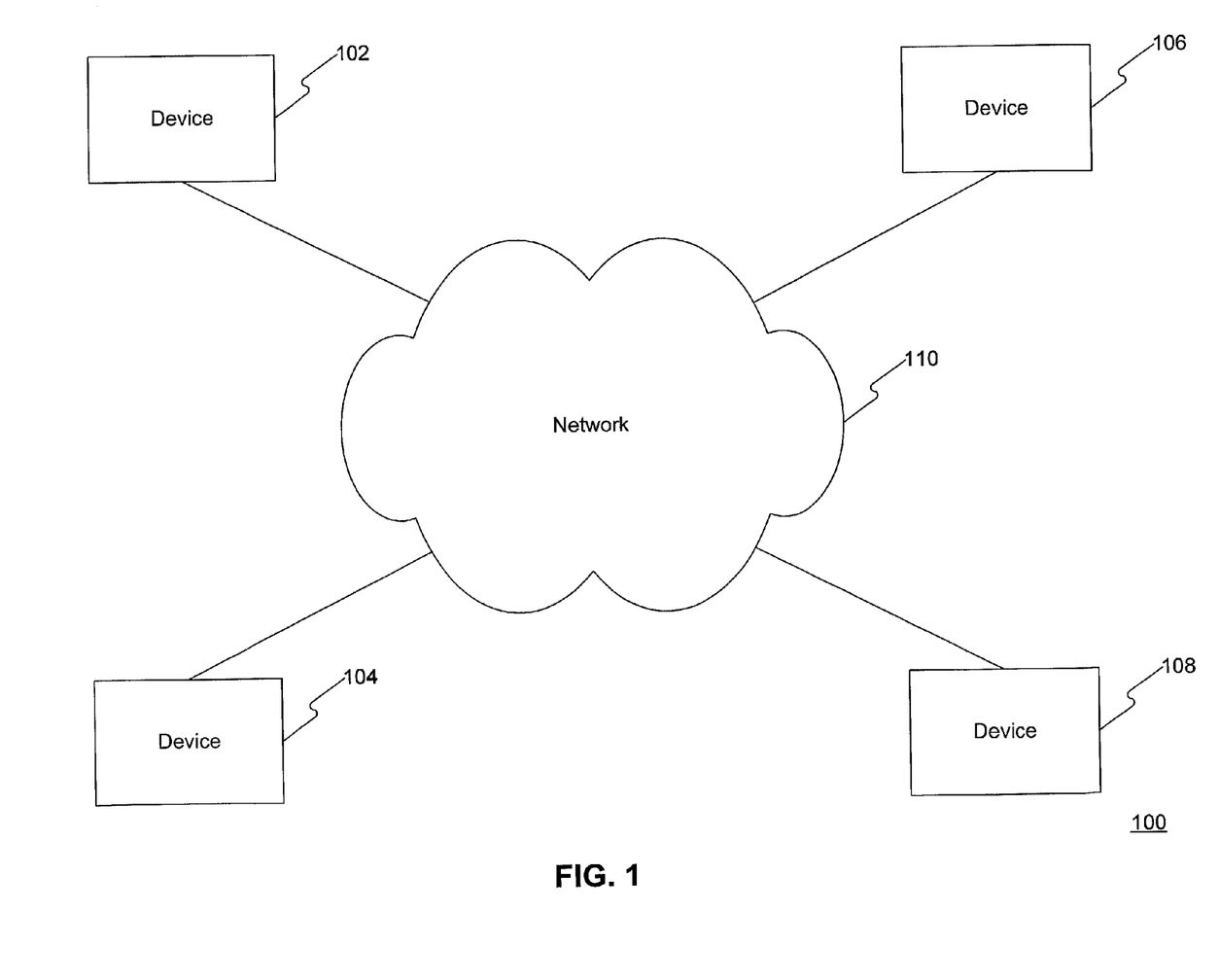
FIG. 1 is a diagram of an exemplary network environment in which features and aspects consistent with the present invention may be implemented.

FIG. 1 is a diagram of an exemplary network environment in which features and aspects consistent with the present invention may be implemented. Network environment 100 comprises a number of devices, such as computers 102–108, connected to a network, such as network 110 (which may comprise a wired or wireless communication network, including the Internet). The components of FIG. 1 may be implemented using hardware, software, and/or firmware. The number of components in network environment 100 is not limited to what is shown.

Computers 102–108 each may contain a CPU and a memory management unit (MMU). The CPU and MMU enable programs or other software with both encrypted and unencrypted regions of instructions and/or data to be executed on computers 102–108. These programs may be distributed to computers 102–108 from a server (not shown) or other device (not shown) using, for example, network 110. Alternatively, a computer-readable medium such as a floppy disk or CD ROM may be used to distribute such programs.

Figure 2:
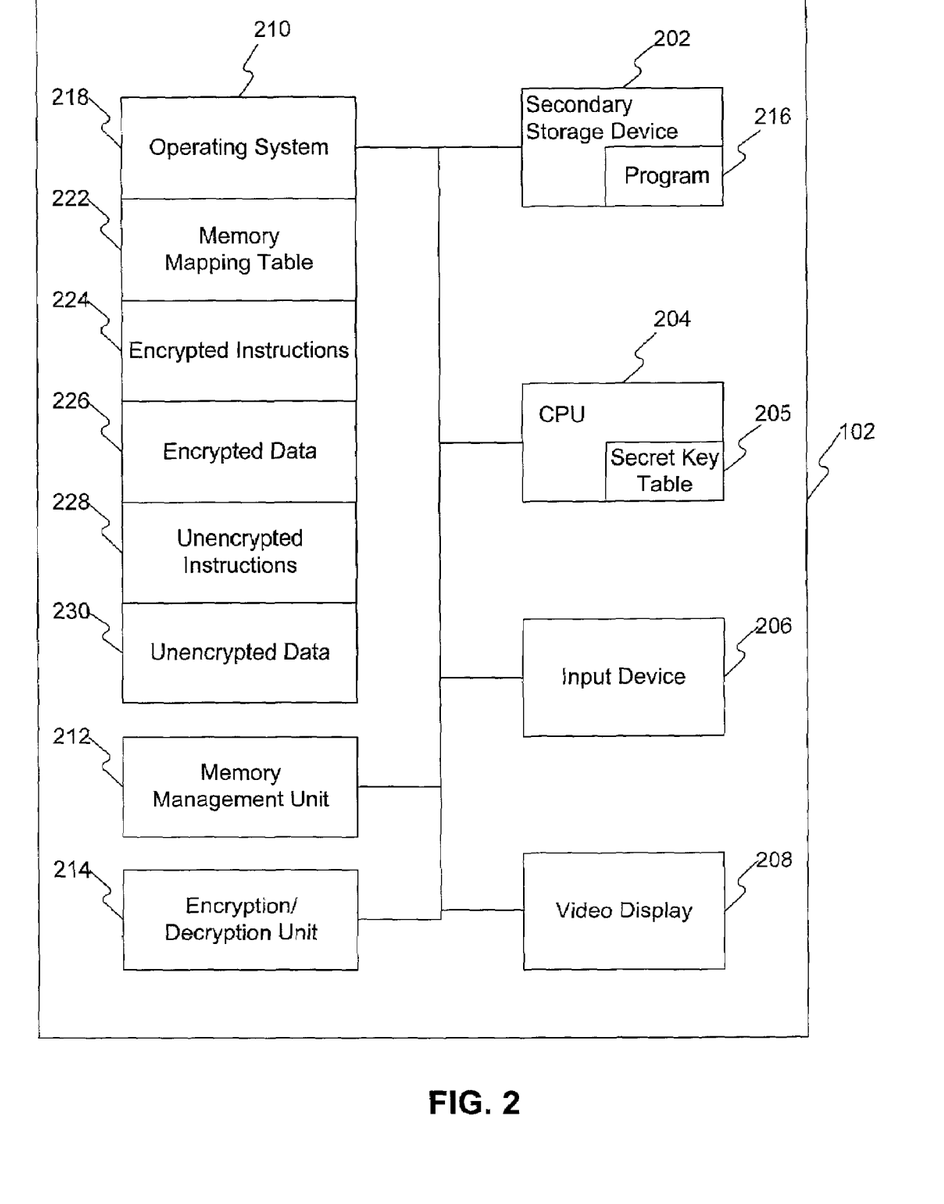
FIG. 2 is a diagram of a device in which features and aspects consistent with the present invention may be implemented.

FIG. 2 is a diagram of computer 102 in greater detail, although computers 104, 106, and 108 may contain the same or similar components. Computer 102 includes a secondary storage device 202, a central processing unit (CPU) 204, an input device 206, a video display 208, a memory 210, a memory management unit (MMU) 212, and an encryption/decryption unit 214. One skilled in the art will appreciate that computer 102 may contain additional or different components.

Secondary storage device 202 includes program 216, which may be software for use on computer 102. Program 216 may include both encrypted and unencrypted instructions and data. The encrypted and unencrypted instructions and data may be accompanied by one or more headers. Alternatively, program 216 may include only encrypted instructions and data accompanied by one or more headers. Encrypted instructions and data from program 216 may be encrypted using, for example, SEAL (Software-Oriented Encryption Algorithm), DES (Data Encryption Standard), or AES (Advanced Encryption Standard). Other encryption methods may also be used in accordance with the present invention. A header in program 216 may include an encrypted secret key that is usable to decrypt instructions and data from program 216. The secret key may be encrypted using a public key associated with a private key belonging to CPU 204.

CPU 204 includes at least one public/private key pair. CPU 204 may use its private key to decrypt a secret key in a header from a program, such as program 216. This secret key may subsequently be used to decrypt instructions and/or data from the program. CPU 204 does not release information about the private and secret keys it uses. CPU 204 may also include secret key table 205. Secret key table 205 contains a plurality of secret keys for use in decrypting instructions or data, such as encrypted instructions 224 or encrypted data 226. The secret keys are associated with key tags which serve as indices into secret key table 205. Secret key table 205 may be populated and/or updated as a program is loaded into memory 210. One of ordinary skill in the art will recognize that secret key table 205 may be located in MMU 212 or encryption/decryption unit 214 instead of CPU 204.

Memory 210 comprises operating system 218, memory mapping table 222, encrypted instructions 224, encrypted data 226, unencrypted instructions 228, and unencrypted data 230.

Memory mapping table 222 contains a plurality of maps for use by MMU 212 in translating a virtual address into a physical address. Memory mapping table 222 also includes key tags associated with the maps. These key tags may be used as indices into secret key table 205 to retrieve a secret key that corresponds to encrypted instructions and/or data associated with the memory location referenced by the relevant map. Key tags may also indicate that a particular memory location is unprotected. One of ordinary skill in the art will recognize that memory mapping table 222 may be located in MMU 212 instead of memory 210.

Encrypted instructions 224, encrypted data 226, unencrypted instructions 228, and unencrypted data 230 comprise areas of memory in which encrypted and unencrypted instructions and data from one or more programs are loaded. These instructions and data may be associated with key tags.

MMU 212 associates key tags with particular memory regions so that every time MMU 212 retrieves a map between a virtual memory address and physical memory address, a corresponding key tag is accessed. The key tag may indicate that the instruction(s) or data at the physical memory address are unencrypted and should be processed in the clear (e.g., without encryption or decryption). The key tag may also be an index into secret key table 205, indicating a specific secret key to be used in decrypting the instruction(s) or data at the physical memory address. One of ordinary skill in the art will recognize that MMU 212 may be located on the same chip as or a different chip from CPU 204.

Figure 3:
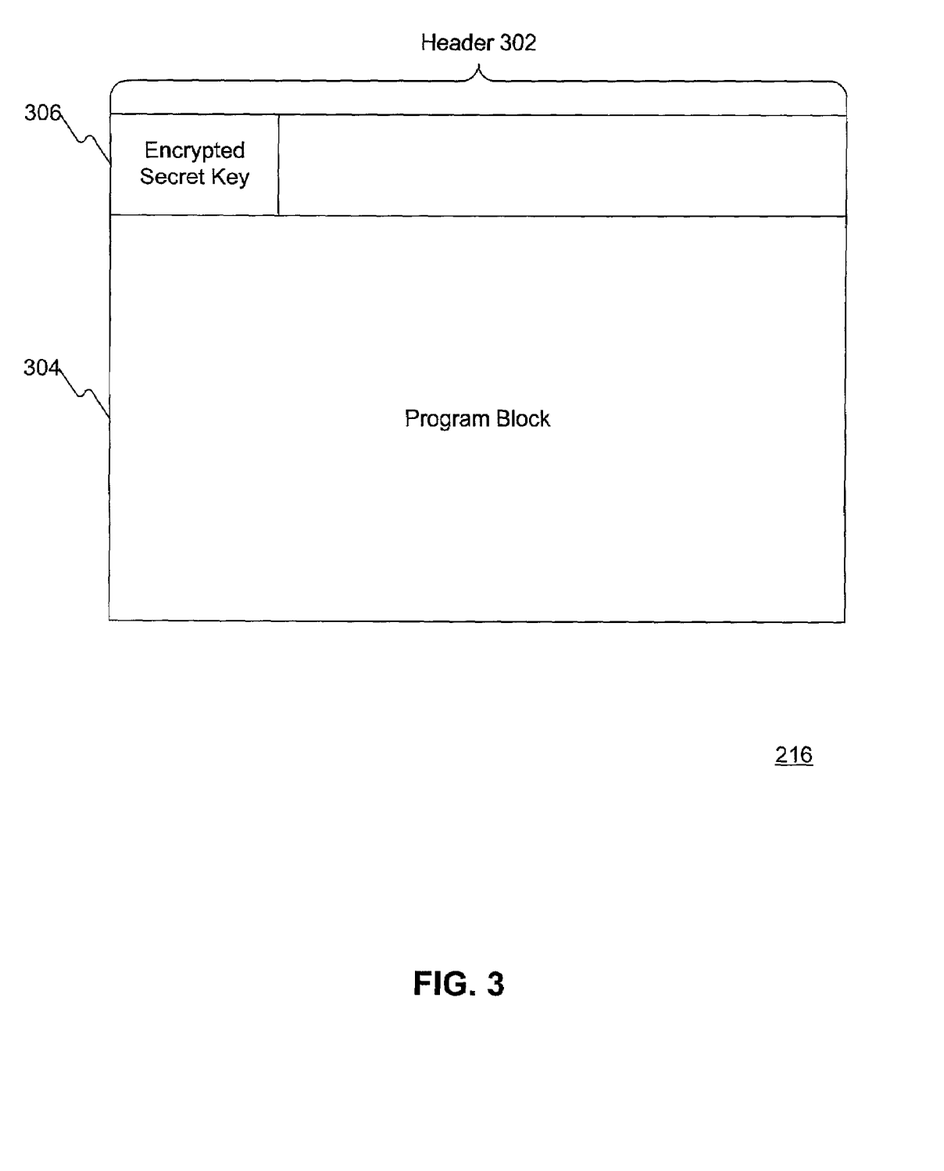
FIG. 3 is a block diagram of an example of a program consistent with the present invention.

FIG. 3 shows an example of program 216 configured in a manner consistent with certain aspects of the present invention. Program 216 includes at least one header 302 and at least one program block 304. One of ordinary skill in the art will recognize that program 216 may comprise a plurality of program blocks 304 each accompanied by a header 302. Header 302 may include an encrypted secret key 306, which is a secret key encrypted by a public key corresponding to a private key of CPU 204. Encrypted secret key 306 may be used to decrypt instructions or data in program block 304. Encrypted secret key 306 may have been further signed with the private key of a third party so that CPU 204 may or may not allow the execution of program block 304 depending on whether it finds the signature valid.

Figure 6:
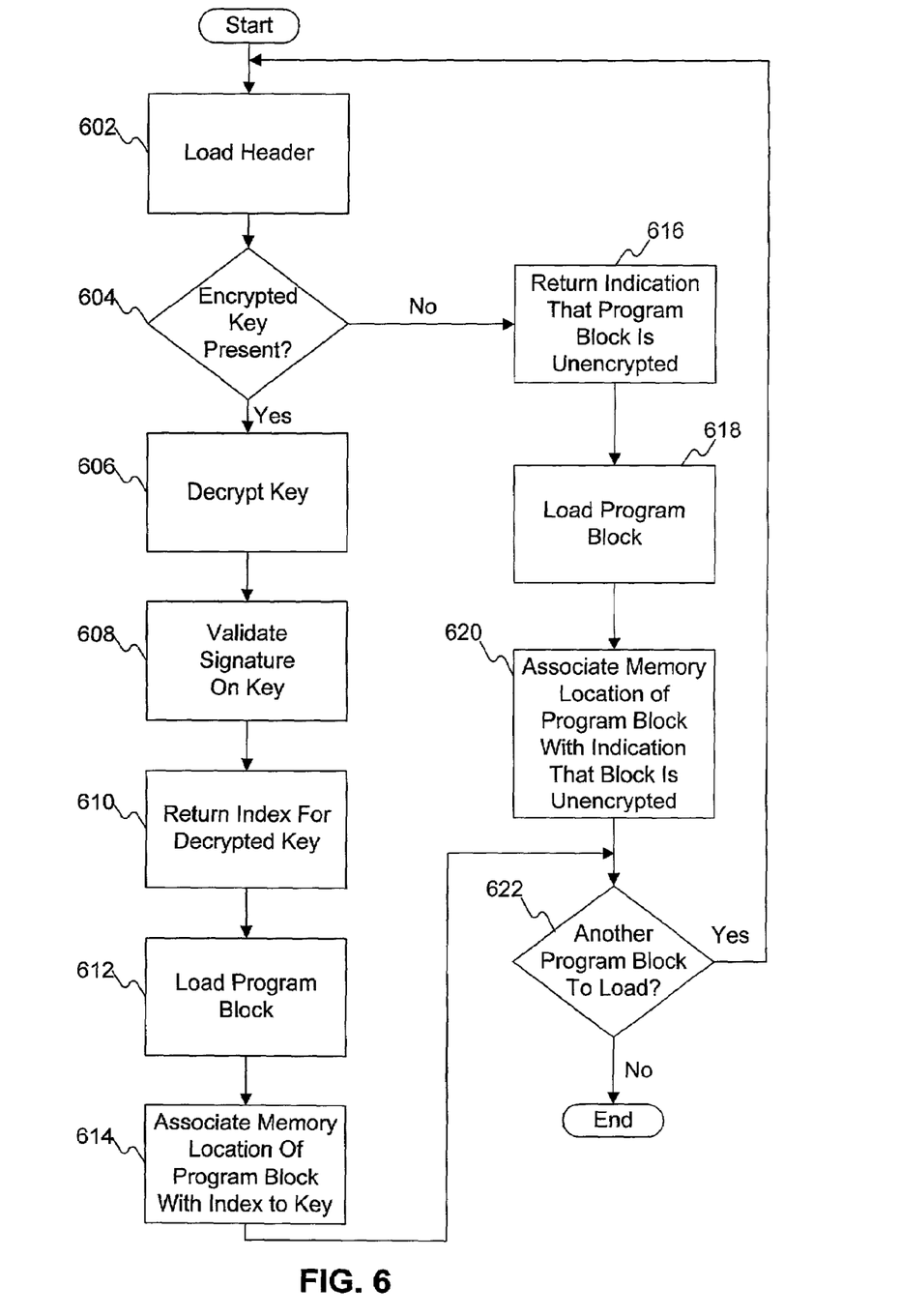
FIG. 6 is a flowchart of an exemplary method for loading a program into memory in a manner consistent with the present invention.

Program block 304 may comprise instructions and/or data encrypted by the secret key in header 306, or it may comprise unencrypted instructions and/or data. In cases where program block 304 comprises unencrypted instructions and/or data, header 302 does not include an encrypted secret key 306. A program 216 may be loaded from secondary storage device 202 into memory 210. Programs may also be loaded into memory 210 from a server or other device remote to computer 102 via network 110. FIG. 6 further explains how a program may be loaded into a memory, such as memory 210, consistent with the present invention.

Figure 4:
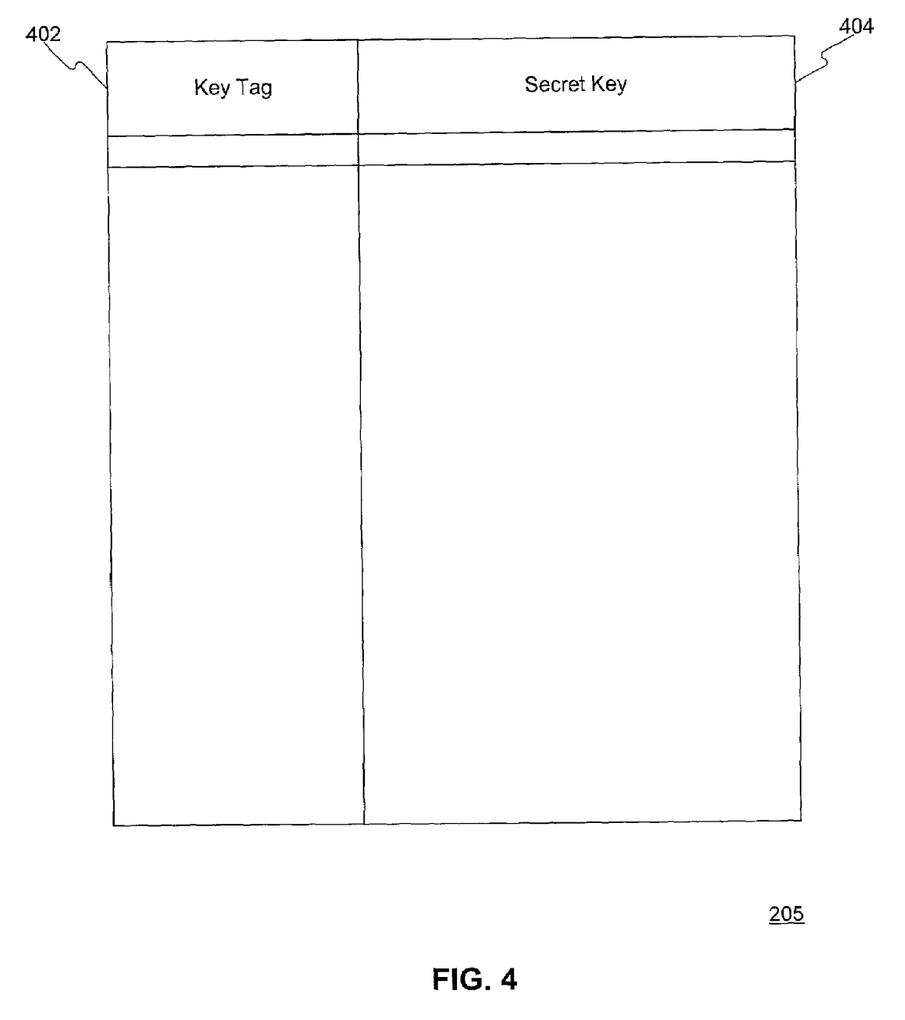
FIG. 4 is a block diagram of an example of a secret key table consistent with the present invention.

FIG. 4 shows an example of secret key table 205 configured in a manner consistent with the present invention. Secret key table 205 has at least two columns, the key tag column 402, and the secret key column 404. Entries under the key tag column 402 may be used as indices to specific secret keys from secret key column 404. For example, CPU 404 may lookup a secret key from secret key column 404 using a key tag from key tag column 402. Each key tag is associated with a region of memory that stores encrypted instruction or data. The secret key corresponding to the key tag may be used to decrypt instructions or data from that region of memory. The secret key may also be used to encrypt data to be written to that region of memory.

Figure 5:
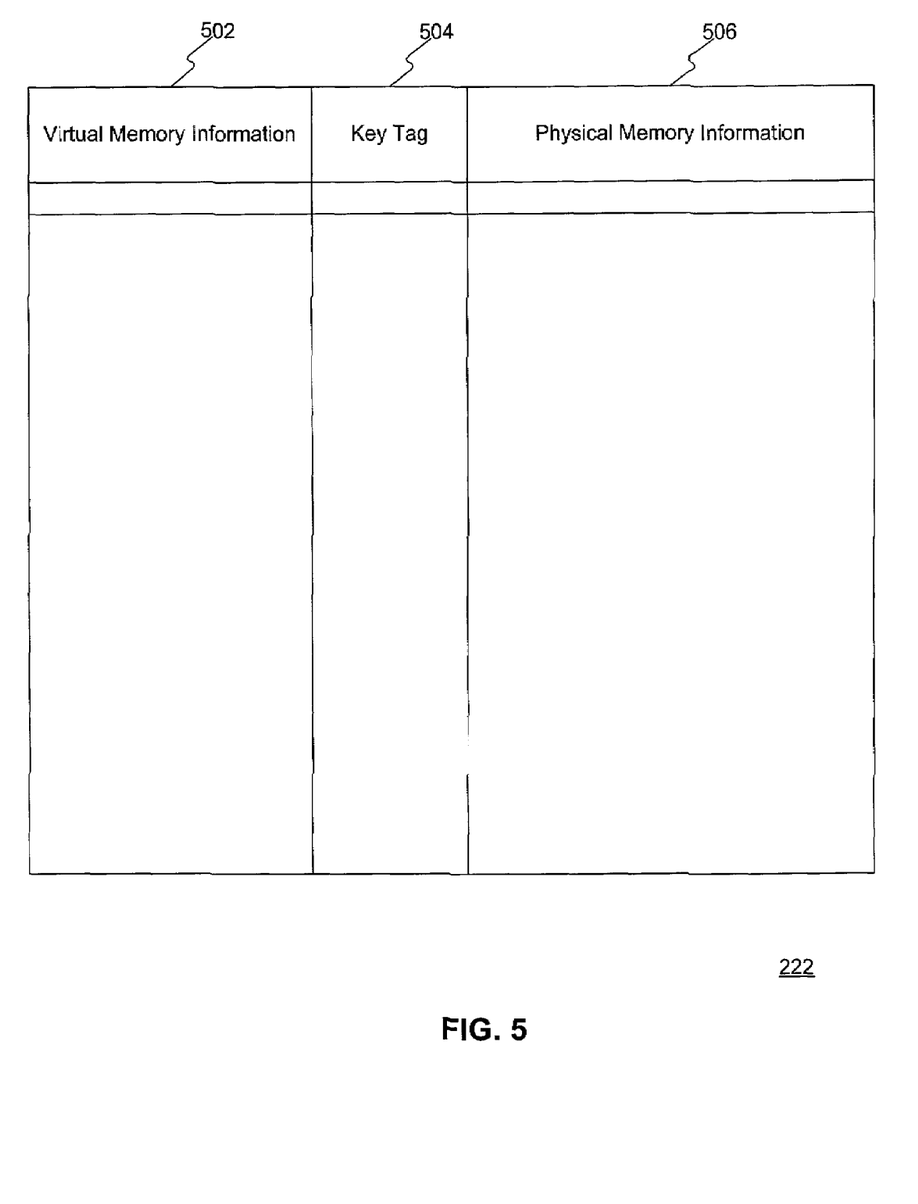
FIG. 5 is a block diagram of an example of a memory mapping table consistent with the present invention.

FIG. 5 shows an example of memory mapping table 222 configured in a manner consistent with the present invention. Memory mapping table 222 has at least three columns, the virtual memory information column 502, the key tag column 504, and the physical memory information column 506. Entries under virtual memory information column 502 may be, for example, virtual page numbers. These virtual page numbers may be used as indices to mapping table 222 to retrieve associated key tags from key tag column 504 and physical memory information, such as physical page numbers, from physical memory information column 506.

For example, CPU 404 may send MMU 212 a virtual address that it desires to access. MMU 212 may parse that virtual address to remove a virtual page number. MMU 212 may then perform a lookup in memory mapping table 222 using the virtual page number as an index. MMU 212 retrieves a key tag and physical page number that corresponds to the virtual page number and sends them to CPU 204 for processing. One of ordinary skill in the art will recognize that complete virtual addresses or other virtual memory information may be stored as entries in virtual memory information column 502 instead of virtual page numbers. One of ordinary skill in the art will also recognize that complete physical addresses or other physical memory information may be stored as entries in physical memory information column 506 instead of physical page numbers.

FIG. 6 is an exemplary flowchart of a method for loading a program into memory in a manner consistent with the present invention. Although the steps of the flow chart are described in a particular order, one skilled in the art will appreciate that these steps may be performed in a different order, or that some of these steps may be concurrent. A program to be loaded into memory may include one or more program blocks with corresponding headers. A program block may be a single instruction, a group of instructions, or a data section of a program. The information in a program block may also be either encrypted or unencrypted.

A header associated with a program block is loaded into memory 210 (step 602). CPU 204 determines whether or not an encrypted secret key is present in the header (step 604). If there is no encrypted secret key in the header, then the program block corresponding to the header is unencrypted and should be processed in the clear (e.g., without encryption or decryption). As such, CPU 204 sends MMU 212 an indication that the program block corresponding to this header is unencrypted (step 616).

The unencrypted program block is then loaded into memory (step 618). MMU 212 also associates the memory location in which the program block was loaded with a key tag that indicates that the program block is unencrypted (step 620). For example, MMU 212 may cause this key tag to be stored in memory mapping table 222 in a row with information corresponding to the virtual and physical memory locations of the program block. A determination may then be made as to whether there is another program block to load into memory (step 622).

If there is an encrypted secret key present in the header, then CPU 204 decrypts the encrypted secret key using a private key that corresponds to the public key used to encrypt the secret key (step 606). The decryption operation may occur through the use of encryption/decryption unit 214, which may perform known crypto operations such as SEAL, DES, or AES operations. Alternatively, CPU 204 may perform the decryption operation without the aid of an encryption/decryption unit 214.

After decrypting the secret key, CPU 204 may validate a third party signature on the key, if a signature is present (step 608). Upon successful validation of the signature (if present), CPU 204 generates an index for the decrypted secret key and returns the index to MMU 212 (step 610). For example, CPU 204 may cause the decrypted secret key to be stored in secret key table 205. A key tag, which is an index into secret key table 205, may be assigned to the secret key depending on the location of the secret key in the secret key table. This key tag serves as an index for the decrypted secret key.

Next, the encrypted program block is loaded into memory (step 612), and the MMU 212 is instructed to associate the memory location of the program block with the key tag sent to MMU 212 from CPU 204 (step 614). For example, MMU 212 may cause this key tag to be stored in memory mapping table 222 in a row with information corresponding to the virtual and physical memory locations of the program block. When CPU 204 subsequently accesses those memory locations, MMU 212 informs it what key tag to use for a lookup in secret key table 205. In this manner, CPU 204 may decrypt or encrypt information associated with the memory locations as necessary. After the association, a determination is made as to whether there is another program block to load into memory (step 622).

Figure 7A:
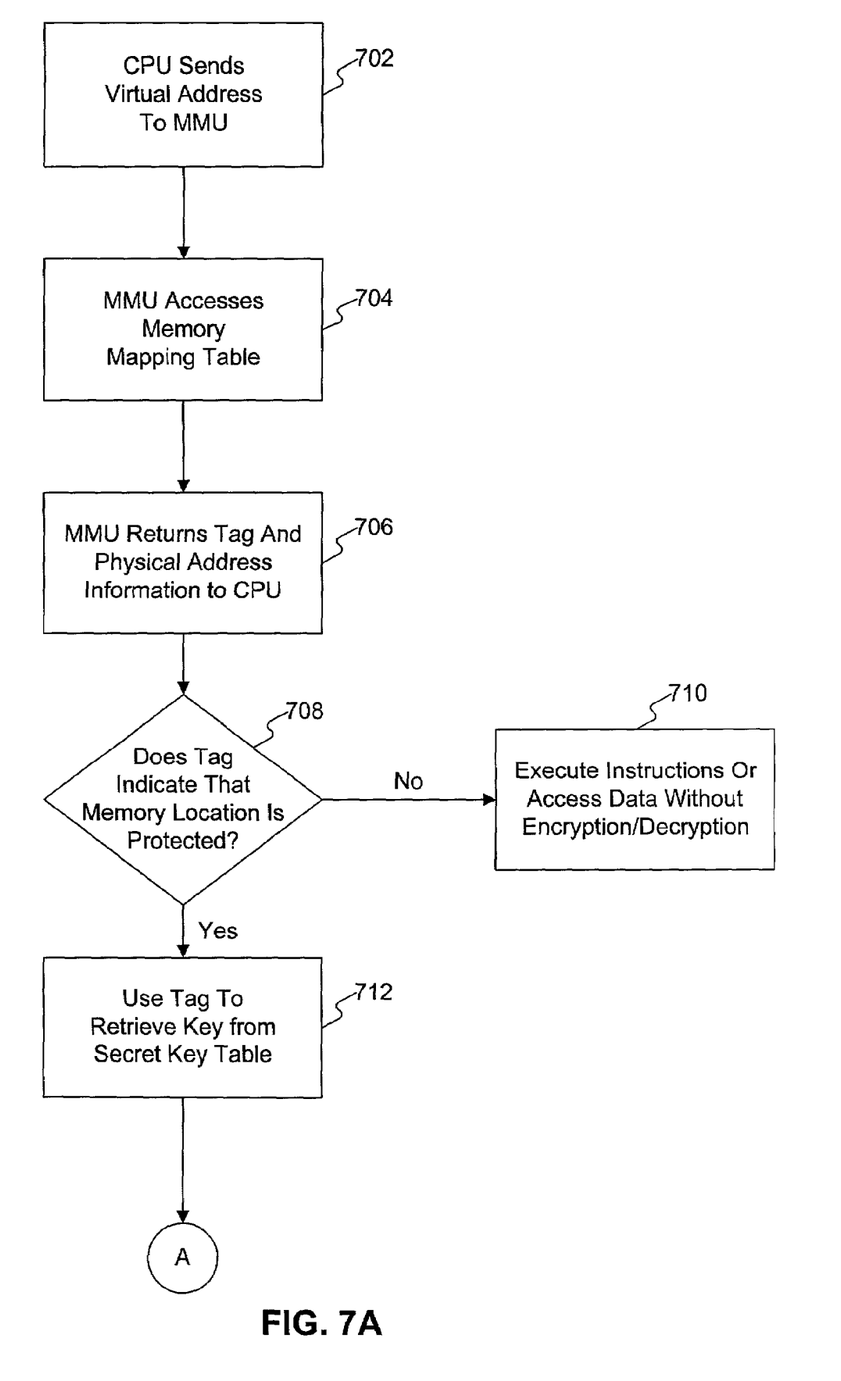
FIGS. 7A and 7B are flowcharts of an exemplary method for executing a program in a manner consistent with the present invention.
Figure 7B:
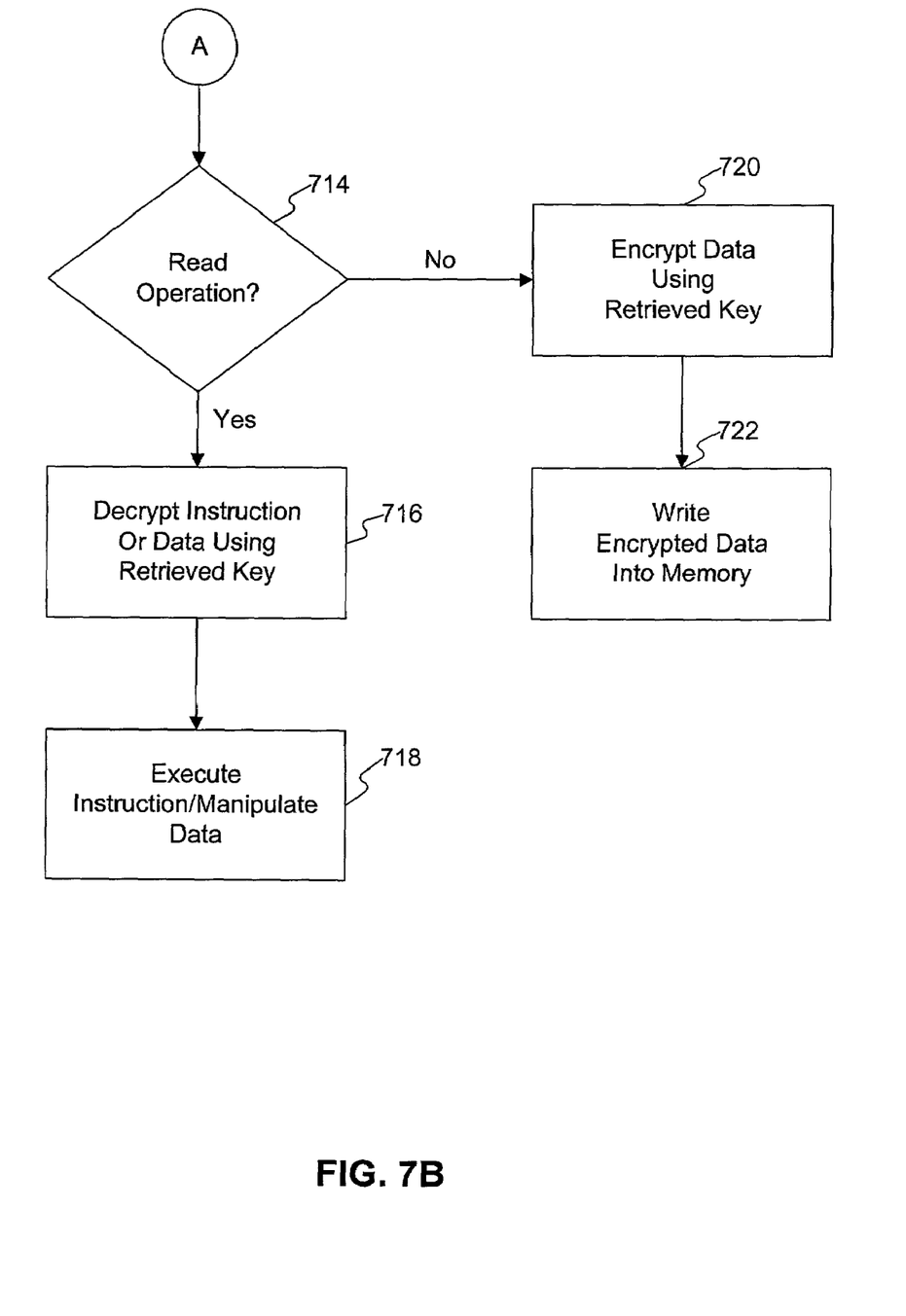

FIGS. 7A and 7B are flowcharts of an exemplary method for executing a program in a manner consistent with the present invention. Although the steps of the flow chart are described in a particular order, one skilled in the art will appreciate that these steps may be performed in a different order, or that some of these steps may be concurrent.

CPU 204 may send MMU 212 a virtual address that corresponds to instructions or data to be processed (step 702). MMU 212 uses the virtual address to access memory mapping table 222 and perform a lookup (step 704). For example, MMU 212 may take virtual page information from the virtual address and use the virtual page information as an index to the memory mapping table 222.

MMU 212 may then retrieve a key tag and physical address information that corresponds to the virtual address information and returns them to CPU 204 (step 706). CPU 204 makes a determination as to whether the key tag indicates that the requested memory location is protected (e.g., stores encrypted information) (step 708). If the key tag indicates that the memory location is unprotected, CPU 204 may then proceed to execute instructions or access data from the memory location without first performing an encryption or decryption operation (step 710).

When the key tag indicates that the memory location is protected, CPU 204 may use the key tag to retrieve a secret key from secret key table 205 (step 712). For example, CPU 204 may use the key tag as an index to secret key table 205 to determine the identity of the corresponding secret key. This secret key may be held ready for accessing a corresponding memory location.

Use of the secret key is dependent on the type of operation to be performed on the memory location. Specifically, information that is to be read from a protected memory section requires decryption before processing. Information that is to be written to a protected memory section requires encryption before storage. Accordingly, a determination is made as to whether the current operation requires reading information from the protected memory location (step 714).

If the operation requires reading information from the protected memory location, then the information (which may comprise instructions and/or data) is read from the memory location and decrypted using the retrieved secret key that corresponds to the memory location (step 716). The decryption operation may occur through the use of encryption/decryption unit 214, which may perform known crypto operations such as SEAL, DES, or AES operations. Alternatively, CPU 204 may perform the decryption operation without the aid of an encryption/decryption unit 214. Thereafter, CPU 204 may execute the decrypted instruction(s) or manipulate the decrypted data as needed (step 718).

If the operation requires writing information to the protected memory location, then the information is encrypted using the retrieved secret key that corresponds to the memory location to be written to (step 720). The encryption operation may occur through the use of encryption/decryption unit 214, which may perform known crypto operations such as SEAL, DES, or AES operations. Alternatively, CPU 204 may perform the encryption operation without the aid of an encryption/decryption unit 214. In one embodiment, information written to a protected memory location may be data but not instructions. Thereafter, CPU 204 may write the encrypted data into the protected memory location (step 722).

Figure 8:
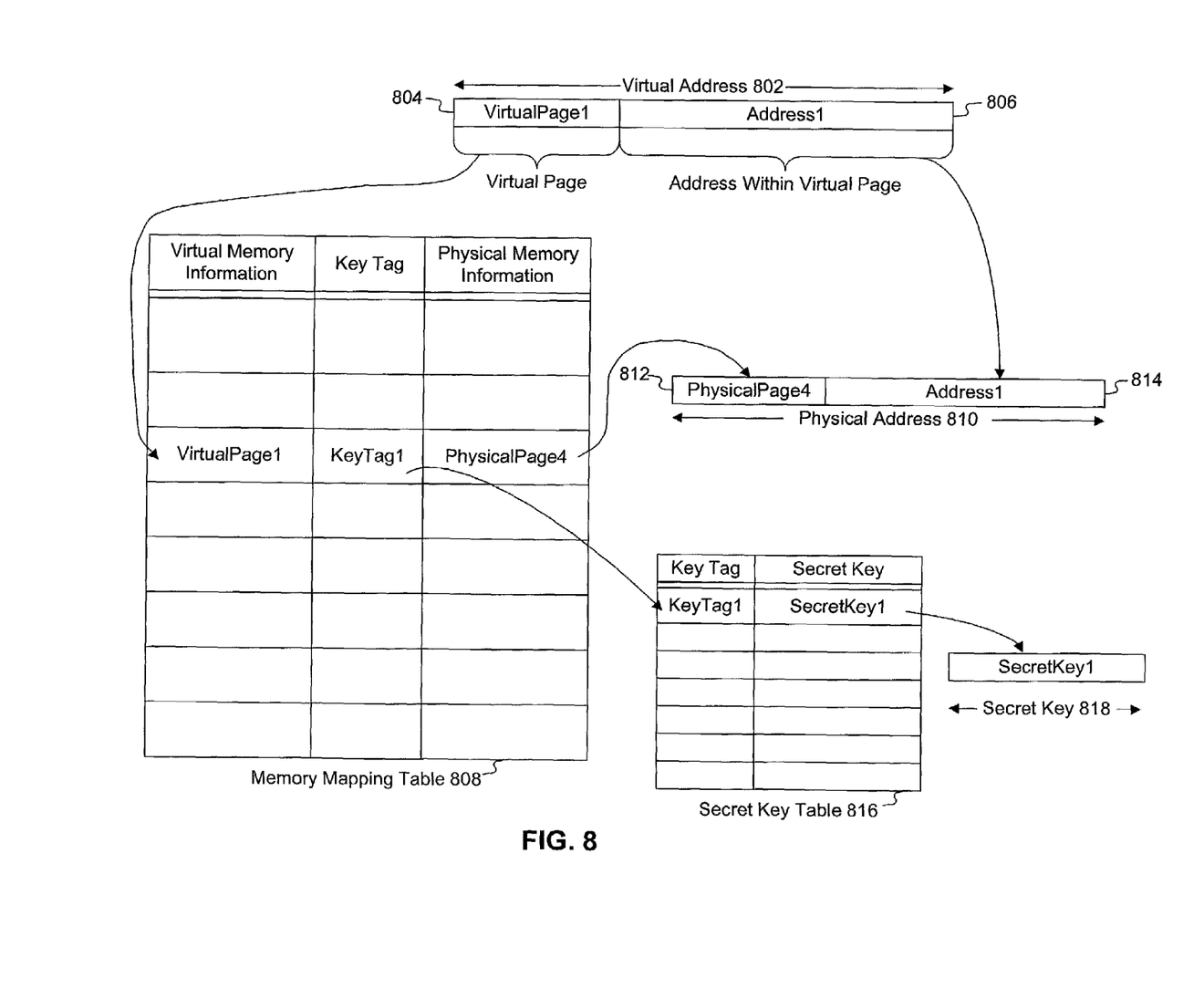
FIG. 8 is a diagram used to explain the process involved in retrieving a secret key for accessing data in a protected memory location in a manner consistent with the present invention.

FIG. 8 shows an example of retrieving a secret key for accessing data in a protected memory location in a manner consistent with the present invention. A CPU that requires access to instructions or data in a protected memory location initially sends an MMU a virtual address 802. Virtual address 802 may comprise a virtual page number 804 and an address 806 within that virtual page. In the example depicted in FIG. 8, virtual page number 804 has a value of "VirtualPage1," and the address 806 within the virtual page has a value of "Address1." The MMU may use "VirtualPage1" as an index to memory mapping table 808.

The MMU determines that "VirtualPage1" has a key tag with a value of "KeyTag1" and physical memory information with a value of "PhysicalPage4" associated with it. The MMU then returns both the key tag and physical memory information to the CPU. Subsequently, the CPU combines "PhysicalPage4" with "Address1" to create a physical address 810. Physical address 810 is the physical location of the requested encrypted instructions or data. Physical address 810 comprises a physical page 810 and an address 814 within the physical page. One of ordinary skill in the art will recognize that other addressing schemes may be used.

Additionally, the CPU uses "KeyTag1" as an index to secret key table 816. The lookup in secret table 816 results in a determination that secret key 818, which has a value of "SecretKey1," is the secret key that corresponds to "KeyTag1." Thereafter, the CPU may use secret key 818 to encrypt or decrypt information stored at physical address 810 as necessary.

While the present invention has been described in connection with various embodiments, many modifications will be readily apparent to those skilled in the art. For example, in one embodiment a CPU may distinguish between different instances of programs, when a multi-user computer runs multiple programs. In another embodiment, by tying a CPU's use of a secret key to a clock or other control signal, programs may run on demand, enabling reliable pay-per-use services.

In addition to associating memory regions with key tags in response to loading a program into memory, a CPU may associate memory regions with specific key tags at runtime. In this manner, the program itself may contain instructions that command the CPU to generate a secret key. Subsequently, the secret key may be stored in a secret key table, and a key tag may be assigned to the secret key depending on the location of the secret key in the secret key table. The memory location of a program block (which may be already stored in memory) to be protected may then be associated with the new key tag. Specifically, the key tag may be stored in a memory mapping table with information corresponding to the virtual and physical memory location of the program block.

Although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave, optical signal or digital signal from a network, such as the Internet; or other forms of RAM or ROM either currently known or later developed. Additionally, although a number of the software components are described as being located on the same machine, one skilled in the art will appreciate that these components may be distributed over a number of machines. The invention, therefore, is not limited to the disclosure herein, but is intended to cover any adaptations or variations thereof.

What is claimed is:

1. A method for accessing information in a memory, comprising:
    providing virtual address information to a memory management unit;
    obtaining, from the memory management unit, a key tag and physical address information corresponding to the virtual address information;
    retrieving a secret key using the key tag when it is determined based on the key tag that a memory location corresponding to the physical address information is protected; and
    decrypting information read from the memory location using the secret key.

2. The method of claim 1, the retrieving comprising:
    looking up the secret key in a secret key table using the key tag based on a determination that the memory location is protected.

3. The method of claim 1, further comprising:
    writing unencrypted data to the memory location based on a determination that the memory location is unprotected.

4. The method of claim 1, further comprising:
    reading unencrypted data from the memory location based on a determination that the memory location is unprotected.

5. The method of claim 1, further comprising:
    executing an unencrypted instruction from the memory location based on a determination that the memory location is unprotected.

6. The method of claim 1, wherein the decrypted information is an instruction, further comprising:
executing the instruction.

7. The method of claim 1, wherein the decrypted information is data.

8. The method of claim 1, further comprising:
encrypting data written to the memory location using the secret key.

9. A method for accessing information in a memory, comprising:
providing a virtual address to a memory management unit;
obtaining a key tag and a physical address corresponding to the virtual address from the memory management unit;
determining, based on the key tag, whether a memory location corresponding to the physical address is protected;
accessing a secret key in a secret key table using the key tag if it is determined that the memory location is protected; and
decrypting information read from the memory location using the secret key.

10. A method for accessing information in a memory, comprising:
receiving a virtual address from a processor;
retrieving a key tag and a physical address corresponding to the virtual address;
determining based on the key tag whether a memory location corresponding to the physical address is protected; and
providing the key tag and the physical address to the processor, wherein a secret key associated with the key tag is used to decrypt information read from the memory location if it is determined that the memory location is protected.

11. The method of claim 10, wherein the secret key is used to encrypt data written to the memory location.

12. The method of claim 10, wherein the decrypted information is data.

13. The method of claim 10, wherein the decrypted information is an instruction.

14. The method of claim 10, the retrieving comprising:
looking up the key tag in a memory mapping table using the virtual address information.

15. A method for accessing information in a memory, comprising:
receiving, at a memory management unit, virtual address information from a processor;
retrieving a key tag and physical address information corresponding to the virtual address information;
sending, from the memory management unit to the processor, a key tag and physical address information corresponding to the virtual address information;
determining whether a memory location corresponding to the physical address information is protected based on the key tag;
accessing a secret key in a secret key table using the key tag based on the determining; and
decrypting information read from the memory location using the secret key.

16. A method for loading encrypted information into a memory, comprising:
determining whether a header associated with a program block includes an encrypted secret key;
decrypting the encrypted secret key to form a decrypted secret key when a result of the determination indicates that the header includes an encrypted secret key;
storing the decrypted secret key in a secret key table;
assigning the decrypted secret key a key tag for use in retrieving the decrypted secret key from the secret key table;
loading the program block into the memory at a first memory location; and
associating the key tag with virtual address information and physical address information corresponding to the memory location, wherein information read from the first memory location is decrypted using the decrypted secret key.

17. The method of claim 16, further comprising:
validating a signature on the decrypted secret key before storing the decrypted secret key in the secret key table.

18. The method of claim 16, further comprising:
providing a key tag indicating that the program block is unencrypted based on a determination that the header does not include the encrypted secret key;
loading the unencrypted program block into the memory at a second memory location; and
associating the key tag indicating that the program block is unencrypted with virtual address information and physical address information corresponding to the second memory location.

19. The method of claim 16, wherein the decrypted information is an instruction.

20. The method of claim 16, wherein the decrypted information is data.

21. The method of claim 16, wherein data written to the first memory location is encrypted using the decrypted secret key.

22. An apparatus for accessing information in a memory, comprising:
means for providing virtual address information to a memory management unit;
means for obtaining, from the memory management unit, a key tag and physical address information corresponding to the virtual address information;
means for retrieving a secret key using the key tag when it is determined based on the key tag that a memory location corresponding to the physical address information is protected; and
means for decrypting information read from the memory location using the secret key.

23. The apparatus of claim 22, the means for retrieving comprising:
means for looking up the secret key in a secret key table using the key tag based on a determination that the memory location is protected.

24. The apparatus of claim 22, further comprising:
means for writing unencrypted data to the memory location based on a determination that the memory location is unprotected.

25. The apparatus of claim 22, further comprising:
means for reading unencrypted data from the memory location based on a determination that the memory location is unprotected.

26. The apparatus of claim 22, further comprising:
means for executing an unencrypted instruction from the memory location based on a determination that the memory location is unprotected.

27. The apparatus of claim 22, wherein the decrypted information is an instruction, further comprising:
means for executing the instruction.

28. The apparatus of claim 22, wherein the decrypted information is data.

29. The apparatus of claim 22, further comprising:
means for encrypting data written to the first memory location using the secret key.

30. An apparatus for accessing information in a memory, comprising:
means for receiving virtual address information from a processor;
means for retrieving a key tag and physical address information corresponding to the virtual address information;
means for determining based on the key tag whether a memory location corresponding to the physical address information is protected; and
means for providing the key tag and physical address information to the processor, wherein a secret key associated with the key tag is used to decrypt information read from the memory location when it is determined that the memory location is protected.

31. The apparatus of claim 30, wherein the secret key is used to encrypt data written to the memory location.

32. The apparatus of claim 30, wherein the decrypted information is data.

33. The apparatus of claim 30, wherein the decrypted information is an instruction.

34. The apparatus of claim 30, the means for retrieving comprising:
means for looking up the key tag in a memory mapping table using the virtual address information.

35. An apparatus for loading encrypted information into a memory, comprising:
means for determining whether a header associated with a program block includes an encrypted secret key;
means for decrypting a secret key based on a result of the determination;
means for storing the decrypted secret key in a secret key table;
means for assigning the decrypted secret key a key tag for use in retrieving the decrypted secret key from the secret key table;
means for loading the program block into the memory at a first memory location; and
means for associating the key tag with virtual address information and physical address information corresponding to the memory location, wherein information read from the first memory location is decrypted using the decrypted secret key.

36. The apparatus of claim 35, further comprising:
means for validating a signature on the decrypted secret key before storing the decrypted secret key in the secret key table.

37. The apparatus of claim 35, further comprising:
means for providing a key tag indicating that the program block is unencrypted based on a determination that the header does not include the encrypted secret key;
means for loading the unencrypted program block into the memory at a second memory location; and
means for associating the key tag indicating that the program block is unencrypted with virtual address information and physical address information corresponding to the second memory location.

38. The apparatus of claim 35, wherein the decrypted information is an instruction.

39. The apparatus of claim 35, wherein the decrypted information is data.

40. The apparatus of claim 35, wherein data written to the first memory location is encrypted using the decrypted secret key.

41. A computer-readable storage device containing instructions for performing a method for accessing information in a memory, the method comprising:
receiving, at a memory management unit, virtual address information from a processor;
retrieving a key tag and physical address information corresponding to the virtual address information;
sending, from the memory management unit to the processor, a key tag and physical address information corresponding to the virtual address information;
determining whether a memory location corresponding to the physical address information is protected based on the key tag;
accessing a secret key in a secret key table using the key tag based on the determining; and
decrypting information read from the memory location using the secret key.

42. A computer-readable storage device containing instructions for performing a method for loading encrypted information into a memory, the method comprising:
determining whether a header associated with a program block includes an encrypted secret key;
decrypting the encrypted secret key to form a decrypted secret key when a result of the determination indicates that the header includes an encrypted secret key;
storing the decrypted secret key in a secret key table;
assigning the decrypted secret key a key tag for use in retrieving the decrypted secret key from the secret key table;
loading the program block into the memory at a first memory location; and
associating the key tag with virtual address information and physical address information corresponding to the memory location, wherein information read from the first memory location is decrypted using the decrypted secret key.

43. An apparatus for accessing information in a memory, comprising:
a processor; and
a memory management unit operable to receive a virtual address from the processor, retrieve a key tag and a physical address corresponding to the virtual address, and send the key tag and physical address to the processor,
wherein the processor receives the key tag and physical address corresponding to the virtual address, determines whether a memory location corresponding to the physical address is protected based on the key tag, retrieves a secret key using the key tag based on the determining, and decrypts information read from the memory location using the secret key.

44. The apparatus of claim 43, wherein the processor writes unencrypted data to the memory location based on a determination that the first memory location is unprotected.

45. The apparatus of claim 43, wherein the processor reads unencrypted data from the memory location based on a determination that the first memory location is unprotected.

46. The apparatus of claim 43, wherein the processor executes an unencrypted instruction from the memory location based on a determination that the first memory location is unprotected.

47. The apparatus of claim 43, wherein the decrypted information is an instruction and the processor executes the instruction.

48. The apparatus of claim 43, wherein the decrypted information is data.

49. The apparatus of claim 43, wherein the processor encrypts data written to the memory location using the secret key.

50. An apparatus for loading encrypted information into a memory, comprising:
   a memory including a program that: determines whether a header associated with a program block includes an encrypted secret key; decrypts the encrypted secret key to form a decrypted secret key when a result of the determination indicates that the header includes an encrypted secret key; stores the decrypted secret key in a secret key table; assigns the decrypted secret key a key tag for use in retrieving the decrypted secret key from the secret key table; loads the program block into the memory at a memory location; and associates the key tag with virtual address information and physical address information corresponding to the memory location, wherein information read from the memory location is decrypted using the decrypted secret key; and
   a processor that runs the program.

51. A method for protecting information in a memory, comprising:
   generating a secret key in response to instructions from a program;
   storing the secret key in a secret key table;
   assigning the secret key a key tag for use in retrieving the secret key from the secret key table; and
   associating the key tag with virtual address information and physical address information corresponding to a memory location of a program block from the program;
   determining whether a memory location corresponding to the physical address information is encrypted based on the key tag, wherein information read from the memory location is decrypted using the secret key if it is determined that the memory location is encrypted.

* * * * *

UNITED STATES PATENT AND TRADEMARK OFFICE
CERTIFICATE OF CORRECTION

| | | |
|---|---|---|
| PATENT NO. | : 7,107,459 B2 | Page 1 of 1 |
| APPLICATION NO. | : 10/046398 | |
| DATED | : September 12, 2006 | |
| INVENTOR(S) | : Germano Caronni et al. | |

It is certified that error appears in the above-identified patent and that said Letters Patent is hereby corrected as shown below:

In claim 29, column 11, line 4, "the first memory" should read --the memory--.

Signed and Sealed this

Twenty-first Day of November, 2006

JON W. DUDAS
*Director of the United States Patent and Trademark Office*